US006529307B1

(12) United States Patent
Peng et al.

(10) Patent No.: US 6,529,307 B1
(45) Date of Patent: Mar. 4, 2003

(54) SELECTIVE INTENSITY MODULATION OF CHANNELS IN A MULTIPLEXED OPTICAL COMMUNICATION SYSTEM

(75) Inventors: Song Peng, Pleasanton, CA (US); Ming Li, Pleasanton, CA (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 09/874,474

(22) Filed: Jun. 4, 2001

Related U.S. Application Data
(60) Provisional application No. 60/209,500, filed on Jun. 5, 2000.

(51) Int. Cl.[7] .................................................. G02F 1/03
(52) U.S. Cl. ........................ 359/256; 359/315; 359/319; 359/245; 359/250
(58) Field of Search ................................. 349/196, 193; 359/115, 117, 122, 128, 129, 130, 131, 256, 245, 315, 246, 316, 250, 310, 722, 589; 385/16, 18, 33, 35, 36, 37

(56) References Cited

U.S. PATENT DOCUMENTS

| | | | |
|---|---|---|---|
| 4,655,547 A | * | 4/1987 | Heritage et al. ............ 359/563 |
| 5,132,824 A | * | 7/1992 | Patel et al. .................... 349/1 |
| 6,275,623 B1 | * | 8/2001 | Brophy et al. ................ 385/14 |
| 6,327,019 B1 | * | 12/2001 | Patel et al. .................. 349/196 |

* cited by examiner

*Primary Examiner*—Huy Mai
*Assistant Examiner*—Tuyen Tra
(74) *Attorney, Agent, or Firm*—Sawyer Law Group LLP (57) ABSTRACT

A method and apparatus for achieving dynamic intensity modulation of the channels in a wavelength-division multiplexed optical communication system is presented. Wavelengths are spatially separated into a plurality of channels, the polarization states of which are individually modulated. The channels can be combined or filtered by polarization states to achieve the desired intensity in the output signal. An exemplary embodiment includes at least a polarization modulator, a birefringent wedge, a lens, and a dispersive element (e.g., diffraction grating) arranged in various order. Each segment of the polarization modulator can be made to rotate the polarization direction of an incident channel by a specified angle. A half-wave plate may be inserted between the second dispersive element and the second birefringent wedge to eliminate polarization-dependent loss. Optionally, a parallel birefringent plate may be inserted after the second birefringent wedge to reduce polarization mode dispersion.

26 Claims, 7 Drawing Sheets

SELECTIVE INTENSITY MODULATION OF CHANNELS IN A MULTIPLEXED OPTICAL COMMUNICATION SYSTEM

RELATED APPLICATIONS

This application is related to Provisional Application No. 60/209,300 filed on Jun. 5, 2000, which is herein incorporated by reference in its entirety.

BACKGROUND

1. Field of the Invention

The present invention relates generally to the field of optical communications, and more specifically, to modulation of optical signals.

2. Discussion of Related Art

Communication networks increasingly rely upon optical fiber for high-speed, low-cost transmission. Optical fibers were originally envisioned as an optical replacement for electronic transmission media, such as high-speed coaxial cable and lower-speed twisted-pair cable. However, even high-speed optical fibers are limited by the electronics at the transmitting and receiving ends. For switching purposes, operating speeds are generally rated at a few gigabits per second, although 40 Gb/s systems have been prototyped. Such high-speed electronic systems are expensive and still do not fully exploit the inherent bandwidth of fiber-optic systems, which can be measured in many terabits per second.

All-optical transmission systems offer many intrinsic advantages over systems that use electronics within any part of the principal transmission path. Wavelength division multiplexing is a commonly used technique that allows the transport of multiple optical signals, each at a slightly different wavelength, on an optical fiber. The ability to carry multiple signals on a single fiber allows that fiber to carry a tremendous amount of traffic, including data, voice, and even digital video signals. For example, the use of wavelength division multiplexing, in combination with time division multiplexing, permits a long distance telephone company to carry thousands or even millions of phone conversations on a single fiber. Wavelength division multiplexing makes it possible to effectively use the fiber at multiple wavelengths, as opposed to the costlier option of installing additional fibers. Using wavelength division multiplexing, optical signals can be carried on separate optical channels with each channel having a wavelength within a specified bandwidth. It is advantageous to carry as many channels as possible within the bandwidth where each channel corresponds to an optical signal transmitted at a predefined wavelength.

U.S. Pat. No. 4,655,547 to Heritage, et. al., entitled "Shaping Optical Pulses by Amplitude and Phase Masking," which is herein incorporated by reference, discloses how an input optical signal can be spatially divided into frequency channels, for example with a diffraction grating. Then, the separated channels are independently operated upon by a segmented modulator. U.S. Pat. No. 5,132,824 to Patel et al., entitled "Liquid Crystal Modulator Array," which is also herein incorporated by reference, discloses using liquid-crystal modulators to manipulate optical pulses. After separating the input optical signal into channels, each channel is separately phase-modulated or amplitude-modulated. The performance of wavelength division multiplexing systems is optimal when signal strength or intensity of each channel is adjusted dynamically. A system and a method for dynamically adjusting the intensity of each channel is needed.

SUMMARY

In accordance with the present invention, a modulation system is presented that can, in some embodiments, achieve dynamic intensity modulation of each channel in a wavelength-division multiplexed optical communication system. The wavelengths may be spatially separated into channels and individually modulated by changing the polarization state of each channel and using the polarization states to selectively combine or filter channels and achieve the desired intensity modulation.

An exemplary embodiment of the present invention includes two birefringent wedges, two lenses, and two dispersive elements (e.g., diffraction gratings) arranged symmetrically at two opposing sides of a segmented polarization modulator. Each segment of the polarization modulator can be made to alter the polarization direction of an incident beam of light by a specified angle. A half-wave plate may be inserted between the second dispersive element and the second birefringent wedge to eliminate polarization-dependent loss. Additionally, a parallel birefringent plate may be inserted after the second birefringent wedge to compensate for any polarization mode dispersion.

A more compact embodiment of the invention can use a reflective surface on the polarization modulator to redirect the beams of light through a dispersive element, a lens, and a birefringent wedge which the beams passed through to reach the reflective surface. In some embodiments, two prisms may be placed around the polarization modulator, instead of a reflective surface, to direct the channels back in the direction from which they came. Alternatively, an aperture may be used to prevent all of the output signals from entering the signal transfer medium, thereby achieving the desired attenuation.

DETAILED DESCRIPTION

A "channel," as used herein, refers to a beam of light that was either spatially separated by wavelength or combined to form one or more rays of light. In some embodiments, a channel may have a wavelength range of less than one nanometer. A "channel," therefore, does not indicate a particular state of polarization. A "beam," as used herein, does not indicate a limited range of wavelength. A "fiber," as used herein, refers to any medium through which optical signals can be transmitted, including but not limited to an optical fiber.

Figure 1A:
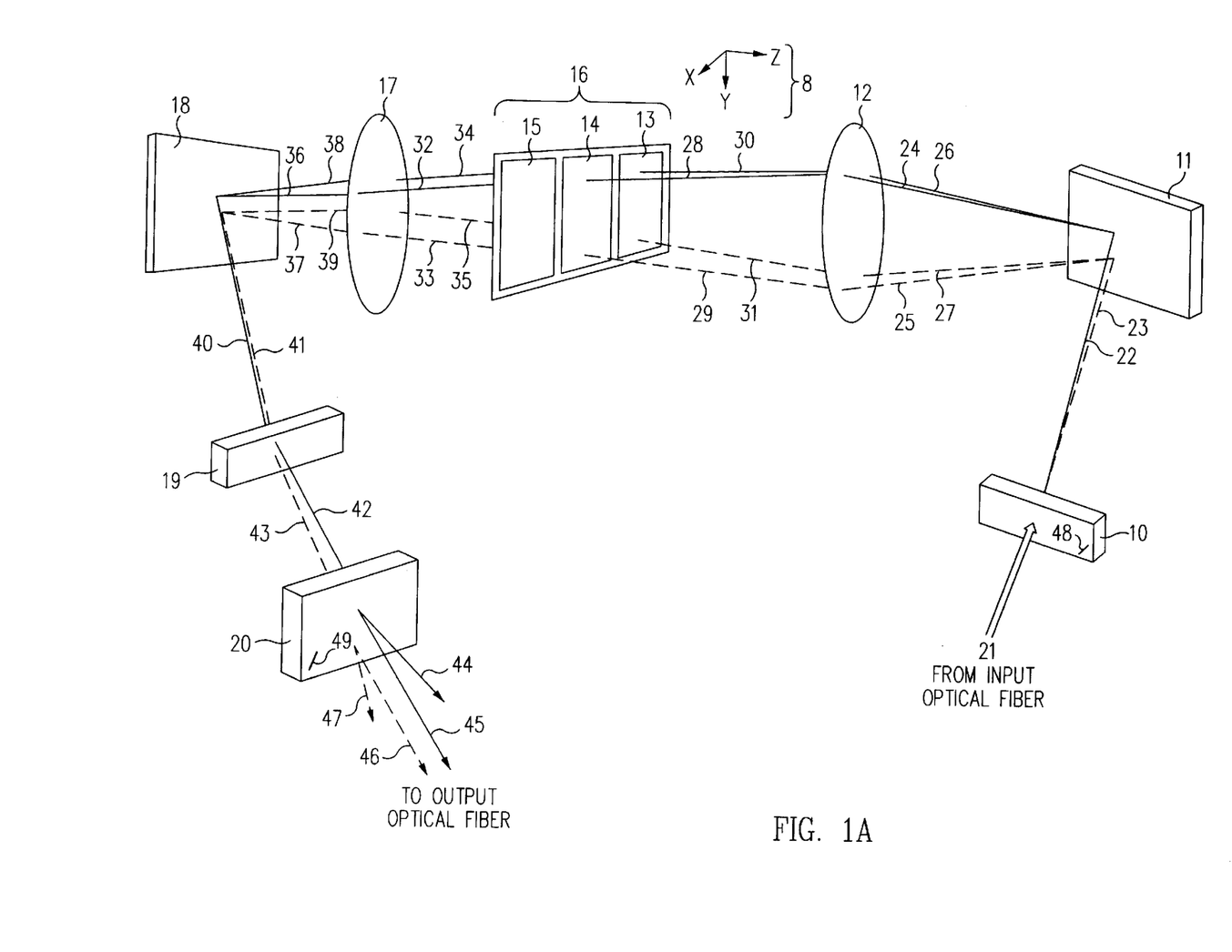
FIG. 1A shows an embodiment of a wavelength-selective intensity modulator according to the present invention.

FIG. 1A depicts an embodiment of WDM wavelength-selective intensity modulator 1 including a first birefringent wedge 10, a first dispersive element 11, a lens 12, a polarization modulator 16, a second lens 17, a second dispersive element 18, a half-wave plate 19, and a second birefringent wedge 20, which are optically coupled. Birefringent wedge 10 has optic axis 48 lying along the z direction as defined by coordinate system 8. Thus, when a beam 21 of arbitrarily polarized light travels along the axis as defined by coordinate system 8 and strikes birefringent wedge 10, the beam is split into a first beam 22 polarized in the y-direction and a second beam 23 polarized in the z-direction. Birefringent wedge 10 may be made of any conventional birefringent material, such as calcite, yttrium vanadate, and yttrium orthovanadate. First dispersive element 11 and second dispersive element 18 may be wavelength-dispersive elements such as diffraction gratings or prisms. Polarization modulator 16 may be, but is not limited to, a liquid-crystal device, and may be substituted by any device that can significantly alter the polarization states of incident channels. Polarization modulator 16 includes a plurality of segments, shown in FIG. 1A as segments 13, 14, and 15 along the x-axis as defined by coordinate system 8. Each segment can be made to change the polarization state of an incident beam. Half-wave plate 19 rotates the polarization direction of an incident beam by ninety degrees. Second birefringent wedge 20 has optic axis 49 lying substantially in the z-direction.

Figure 1B:
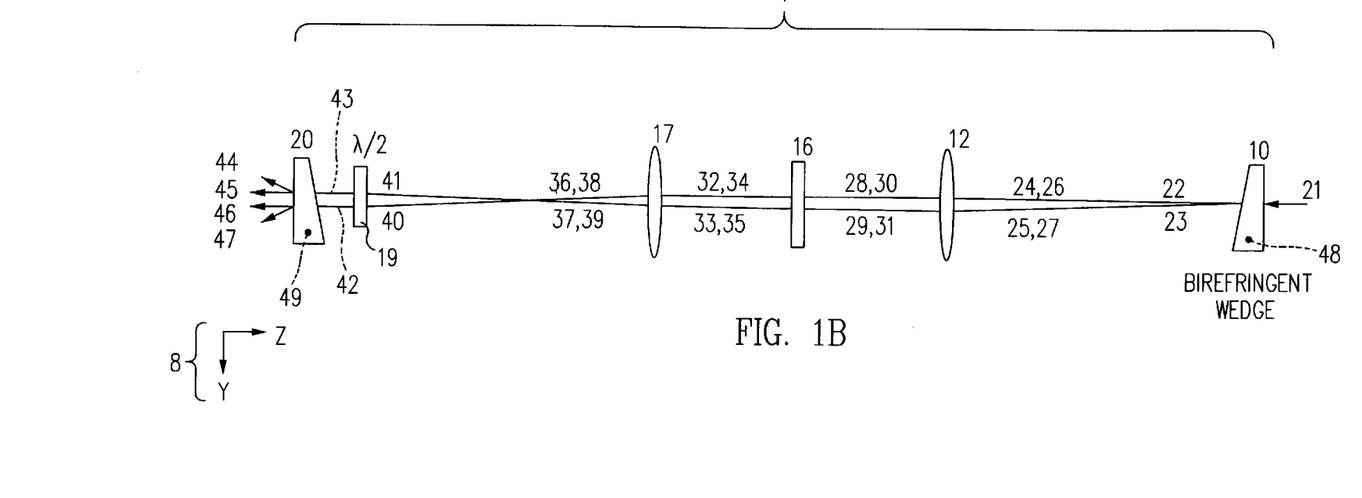
FIG. 1B shows the embodiment shown in FIG. 1A from the perspective of a y-z plane.

FIG. 1B shows the embodiment of FIG. 1A from the perspective of y-z plane as defined by coordinate system 8. For clarity of illustration, FIG. 1B does not show first and second dispersive elements 11 and 18. Input signal 21 is typically a collimated broad-band beam of an arbitrary polarization state. The polarization state of input signal 21 may be time-varying. When input signal 21 from an input optical fiber (not shown) strikes first birefringent wedge 10, input signal 21 splits into two orthogonally linearly polarized beams, first beam 22 and second beam 23, along the y-axis as defined by coordinate system 8. For clarity of illustration, FIG. 1A shows first beam 22 with a solid line and second beam 23 with a dashed line. If first birefringent wedge 10 has a greater index of refraction along the extraordinary axis (e.g., as in yttrium orthovanadate) than along the ordinary axis, first beam 22 will have a polarization direction perpendicular to optic axis 48, and second beam 23 will have a polarization direction parallel to optic axis 48.

First and second beams 22 and 23 strike dispersive element 11 (not shown in FIG. 1B), which spatially separates first beam 22 by wavelength into channels 24 and 26 and spatially separates second beam 23 into channels 25 and 27, along the x-axis as defined by coordinate system 8. Although only two wavelength channels are shown for clarity, input beam 21 may contain more than two wavelength channels. Lens 12 focuses the incident channels 24, 25, 26, and 27 onto different segments of polarization modulator 16. Lens 12 focuses beams 26 and 27 onto segment 13 of polarization modulator 16 and beams 24 and 25 onto segment 14 of polarization modulator 16. Each of segments 13, 14, and 15 can be set to change the polarization state of incident beams in a desired manner. After passing through segments 13 and 14, channels 28 and 30, which are assumed to be polarized in a direction perpendicular to optic axis 48 as mentioned above, may become elliptically polarized channels 32 and 34, respectively. Similarly, channels 29 and 31, which are assumed to be polarized in a direction parallel to optic axis 48, may become elliptically polarized channels 33 and 35 after passing through segments 13 and 14. Channels 32, 33, 34, and 35 strike second lens 17, which collimates channels 32, 33, 34, and 35 to form channels 36, 37, 38, and 39. Collimation may be achieved by positioning lens 17 a focal length away from polarization modulator 16 in the particular medium between lens 17 and polarization modulator 16. "Focal length," as used herein, refers to the focal length of lens 17. Collimated channels 36, 37,38, and 39 strike second dispersive element 18, which recombines the channels into output beams 40 and 41. In the embodiment shown in FIG. 1A and FIG. 1B, channels 36 and 38 are combined into first output beam 40, and channels 37 and 39 are combined into second output beam 41. First and second output beams 40 and 41 are generally elliptically polarized.

Output beams 40 and 41 each contain two orthogonal polarization components. Of the two polarization components in output beams 40 and 41, the polarization components that result from rotation by polarization modulator 16 is rotated ninety degrees by half-wave waveplate 19. Output beams 42 and 43 enter second birefringent wedge 20, which has optic axis 49 lying substantially in the z-direction as shown in FIG. 1A and defined by coordinate system 8. Birefringent wedge 20 splits output beam 42 into output signals 44 and 45 according to polarization states. Similarly, birefringent wedge splits output channel 43 into output signals 46 and 47 according to polarization states. Output signals 45 and 46 propagate in a parallel direction with respect to each other, and are therefore both coupled into an output fiber (not shown). Output signals 44 and 47, which constitute light having the original polarization states of first and second input beams 22 and 23, propagate at an angle with respect to output signals 45 and 46. Output signals 44 and 47 are therefore not coupled into an optical fiber, resulting in the attenuation of the output signal. By controlling the segments of polarization modulator 16, the intensity of output signals 45, 46, 47, and 48 can be modulated.

Although the embodiment shown in FIG. 1A and FIG. 1B results in a non-zero polarization-mode dispersion (PMD) due to the finite thickness of first and second birefringent wedges 10 and 20, the PMD can be easily compensated by inserting a planar parallel wave plate (not shown) after second birefringent wedge 20. The parallel wave plate should have the combined thickness of first and second birefringent wedges 10 and 20, and its optic axis should be perpendicular to optic axis 49, i.e. lie along the y-direction as defined by coordinate system 8 and as shown in FIG. 1A.

Figure 2:
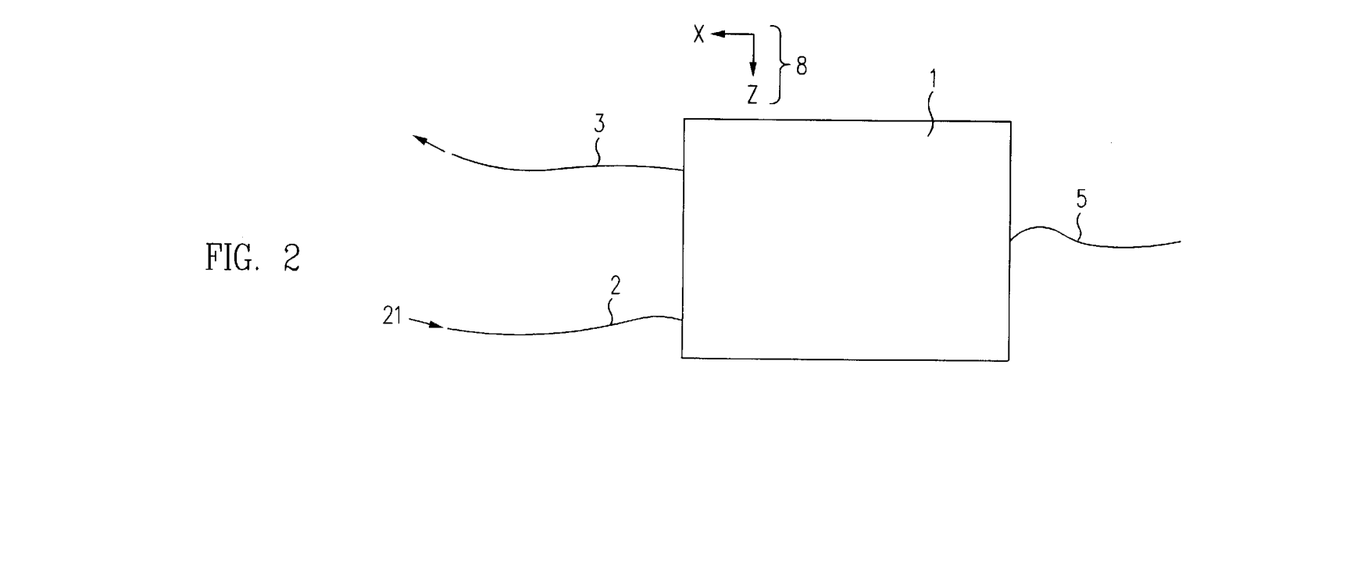
FIG. 2 schematically shows an input signal entering and multiple output signals exiting a wavelength-selective intensity modulator according to the present invention.

FIG. 2 depicts input signal 21 traveling through a signal transfer medium (e.g., optical fiber) and reaching WDM wavelength-selective intensity modulator 1 of the present invention through port 2. Input signal 21 passes through input port 2 in substantially the x-direction as defined by coordinate system 8. Output signals leave WDM wavelength-selective intensity modulator 1 through output port 3. Electrical signals 5 control the segments of polarization modulator 16. As previously explained, tuning the segments of polarization modulator 16 modulates the intensity of output signals that pass through output port 3.

Figure 3A:
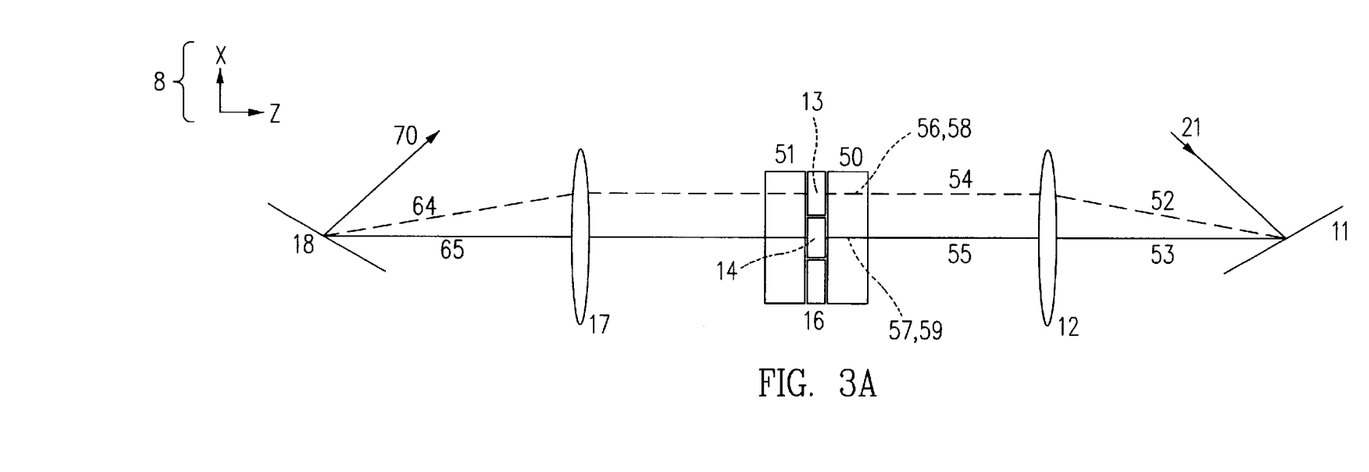
FIG. 3A shows an embodiment of a wavelength-selective intensity modulator according to the present invention which includes two birefringent displacers sandwiching a segmented polarization modulator.

FIG. 3A shows an embodiment which includes first birefringent beam displacer 50 and second birefringent beam displacer 51 sandwiching polarization modulator 16 along the direction in which the channels propagate. Collimated input signal 21 strikes dispersive element 11 and spatially separates into channel 52 and channel 53 substantially along the x-axis as defined by coordinate system 8. FIG. 3A depicts channel 52 with a dashed line and channel 53 with a solid line. Lens 12 focuses channels 52 and 53 onto different segments of polarization modulator 16. After being focused, channels 52 and 53 are shown as focused channels 54 and 55, respectively. Although two channels are shown for clarity, input signal 21 may include more than two channels.

Figure 3B:
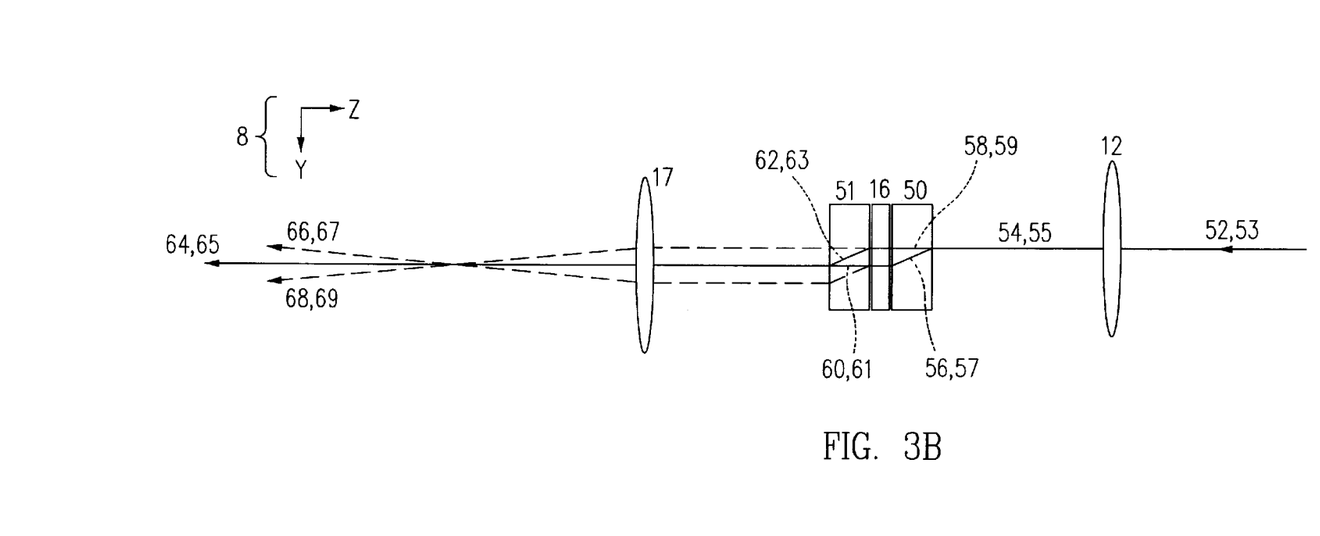
FIG. 3B shows a y-z plane perspective of the embodiment shown in FIG. 3A.

FIG. 3B illustrates the embodiment of FIG. 3A from the perspective of y-z plane as defined by coordinate system 8. For clarity of illustration, FIG. 3B omits dispersive elements 11 and 18. First and second birefringent beam displacers 50 and 51, which are identical, have optical axes in the y-z plane as defined by coordinate system 8. In the example illustrated in FIG. 3A and FIG. 3B, focused channel 54 strikes segment 13 of polarization modulator 16 and focused channel 55 reaches segment 14.

Upon striking first birefringent beam displacer 50, focused channel 54 separates into beam 56 and beam 58 of orthogonal polarization states. Beam 58 is polarized in the x-direction as defined by coordinate system 8, and therefore passes through first birefringent beam displacer 50 without being displaced. Beam 56, however, is polarized in the y-direction as defined by coordinate system 8, and is therefore displaced along the y-direction as defined by coordinate system 8. Thus, beams 56 and 58 are focused onto two spots on segment 13 that are separated along the y-axis as defined by coordinate system 8. Segment 13 is set up so that after passing through segment 13, at least a portion of beam 56 becomes polarized in the x-axis, forming beam 60. Beam 60 passes through second birefringent beam displacer 51 without displacement. As for beam 58, at least a portion of beam 58 becomes polarized in the y-axis by segment 13 and forms beam 62. Beam 62 is displaced along the y-axis as defined by coordinate system 8. Beams 60 and 62 combine to form output channel 64. Output channel 64 is coupled into an output optical fiber (not shown).

The portion of beam 56 having a polarization state unaffected by segment 13 is displaced along the y-axis and forms channel 66, as shown by the dashed line. The portion of beam 58 having a polarization state unaffected by segment 13 passes through second birefringent beam displacer 51 without being displaced, and forms channel 68, shown by the dashed line. Channels 66 and 68, unlike output channel, 64, are not coupled into the output fiber. Therefore, controlling the degree of polarization of beams 56 and 58 through segment 13 of polarization modulator 16 results in the modulation of output signal 64.

Focused channel 55 passes through first and second birefringent beam displacers 50 and 51 and polarization modulator 16 in a manner similar to focused channel 54. Upon striking first birefringent beam displacer 50, focused channel 55 separates into beam 57 and beam 59. Beam 59 is polarized in the x-direction as defined by coordinate system 8, and therefore passes through first birefringent beam displacer 50 without being displaced. Beam 57, however, is polarized in the y-direction as defined by coordinate system 8, and is therefore displaced along the y-direction as defined by coordinate system 8. Thus, beams 57 and 59 are focused onto two spots on segment 14 that are separated along the y-axis as defined by coordinate system 8. Segment 14 is set up so that the polarization state of a portion of the incident light is altered. Thus, after passing through segment 14, a portion of beam 57 becomes polarized in the x-axis, forming beam 61. Beam 61 passes through second birefringent beam displacers 51 without displacement. As for beam 59, a portion of beam 59 becomes polarized in the y-axis by segment 14 and forms beam 63. Beam 63 is displaced along the y-axis as defined by coordinate system 8. Beams 61 and 63 combine to form output channel 65, which is coupled into an output fiber (not shown).

The portion of beam 57 having a polarization state unaffected by segment 14 is displaced along the y-axis and forms channel 67, as shown by the dashed line. The portion of beam 59 having a polarization state unaffected by segment 14 passes through second birefringent beam displacers 51 without being displaced, and forms channel 69, shown by the dashed line. Channels 67 and 69, unlike output channel 65, are not coupled into the output optical fiber. Therefore, controlling the degree of polarization of beams 57 and 59 through segment 14 of polarization modulator 16 results in the modulation of output signal 65. If input signal 21 is composed of more than two channels, a person of ordinary skill in the art would understand that how to achieve attenuation with the other channels in the manner described above with regard to channels 52 and 53.

Figure 4:
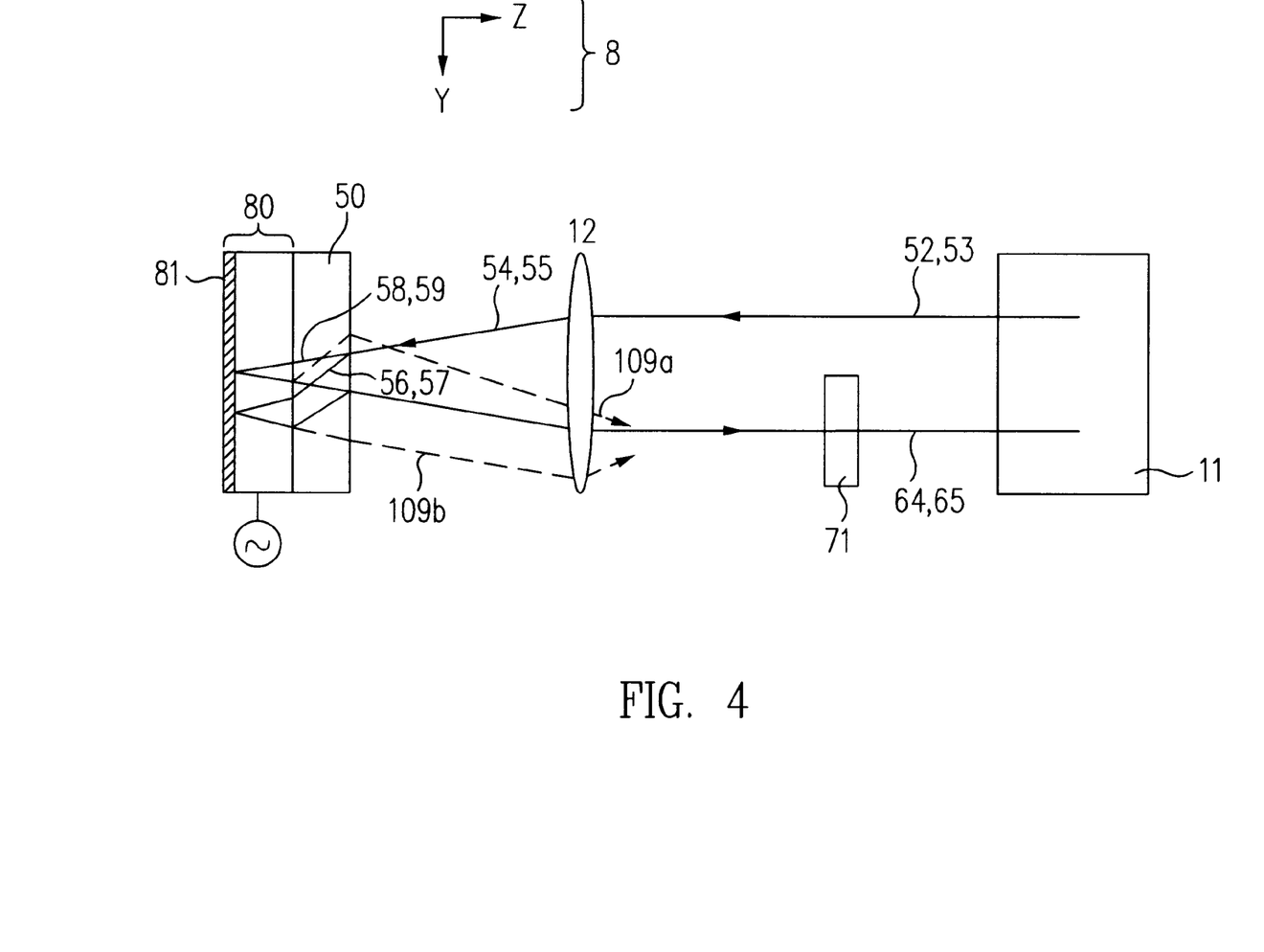
FIG. 4 shows a compact version of the embodiment shown in FIG. 3A and FIG. 3B using a half-wave plate to reduce polarization dependent loss.

FIG. 4 shows a compact version of the embodiment shown in FIG. 3A and 3B. The embodiment in FIG. 4 uses reflective polarization modulator 80 instead of polarization modulator 16, dispersive element 11, and a birefringent wave plate (not shown). Reflective polarization modulator 80, which has a reflective surface 81, is a waveplate with retardation tunable in the range between zero and quarter wavelength. The optic axis of the wave plate lies at a 45-degree angle to both the x-axis and the y-axis as defined by coordinate system 8. When input channels 52 and 53 strike first birefringent beam displacer 50, the portion that is polarized in the x-direction as defined by coordinate system 8 (i.e., beams 58 and 59) passes through without displacement, while the portion that is polarized in the y-direction (beams 56 and 57) is displaced. When retardation for a channel is tuned to zero, reflective polarization modulator 80 does not change the polarization of incident channels. Thus, when retardation is set at zero, channels 52 and 53 (which become focused channels 54 and 55 after passing through lens 12) travel through birefringent beam displacer 50 and reflective polarization modulator 80 in the path shown with solid lines, and the channels are not attenuated. On the other hand, when retardation is set at a non-zero value, reflective polarization modulator 80 changes the polarization of incident beams. When the polarization direction is changed, the reflected channels each split into two beams upon passing through birefringent beam displacer 50 on their way to dispersive element 11. The portion of beam 58 that became polarized in the y-direction as defined by coordinate system 8 is displaced along the y-direction, as shown by dashed line 109a. The portion of beam 56 that became polarized in the x-direction as defined by coordinate system 8, on the other hand, is not displaced when passing through first birefringent beam displacer 50, as shown by dashed line 109b. Beams depicted by dashed lines 109a and 109b propagate in different directions from beams 64 and 65, and are not coupled into the output fiber. Elimination of the two beams leads to channel attenuation, and the degree of attenuation is controlled by tuning reflective polarization modulator 80.

Half-wave waveplate 71 with an optic axis aligned 45 degrees to both the x- and the y-axes as defined by coordinate system 8 can be used to eliminate polarization dependent loss (PDL). Half-wave waveplate 71 rotates the polarization of an incident channel to balance the diffraction efficiencies of the gratings. Thus, the PDL caused by the grating can be eliminated. Furthermore, PMD can be eliminated with a birefringent plate in the embodiment shown in FIG. 4, as described above with regard to the embodiment shown in FIG. 1A and FIG. 1B.

Figure 5A:
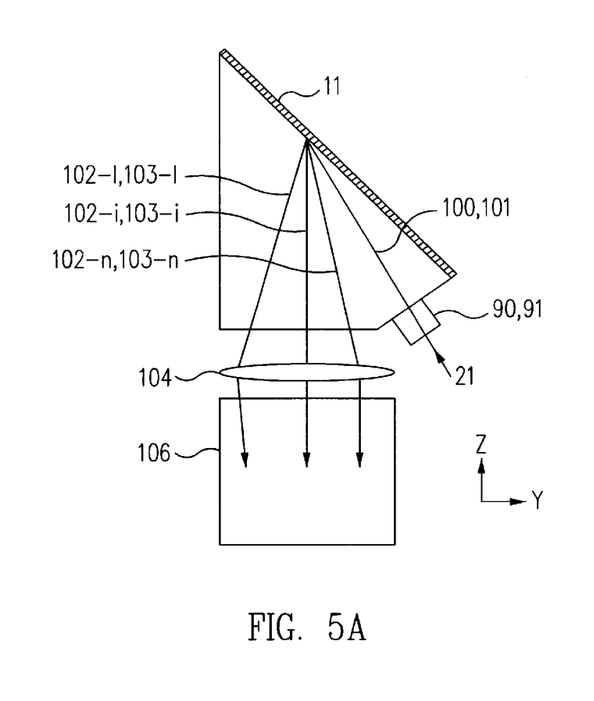
FIG. 5A shows an embodiment of the wavelength-selective intensity modulator including two prisms and a dispersive element.

FIG. 5A depicts an embodiment of intensity modulator that uses birefringent beam displacers 90 and 91, a dispersive element 11 (e.g., Echelle grating), a polarization modulator 16, a lens 104, and two prisms 106a and 106b. Input signal 21 passes through birefringent beam displacer 90 which has an optic axis in the x-z plane. Birefringent beam displacer 90 spatially separates input signal 21 along the x-axis as defined by coordinate system 8, into beam 100 and beam 101 of orthogonal polarization states. In the example provided, beam 100 is polarized perpendicular to the optic axis of birefringent beam displacer 90, and therefore passes through birefringent beam displacer 90 without displacement. Beam 101, on the other hand, is polarized in the x-z plane which contains the optic axis of birefringent beam displacer 90, and is therefore displaced along the x-axis. Upon striking dispersive element 11, beam 100 separates into channels 102-1 through 102-n along the y-axis as defined by coordinate system 8, and beam 101 separates into channels 103-1 through 103-n, also along the y-axis. As used herein, channels 102-i and 103-i refer to one of beams 102-1 through 102-n and one of beams 103-1 through 103-n, respectively, "n" indicating the total number of channels in each of beam 100 and beam 101. Channels 102-1 through 102-n and channels 103-1 through 103-n travel through lens 104, which focuses the channels onto prisms 106. Lens 104 may include, for example, a cylindrical lens or two conventional, rotationally symmetrical lenses.

Figures 5B, 5C:
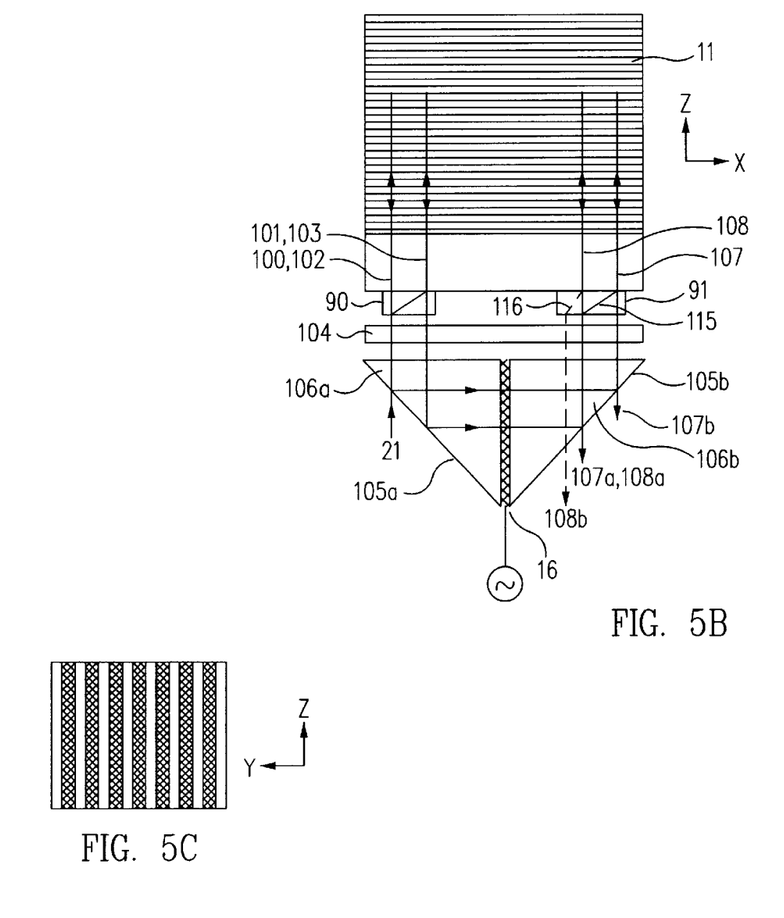
FIG. 5B shows the embodiment of FIG. 5A from the x-z plane.
FIG. 5C shows the polarization modulator used in the embodiment of FIG. 5A.

FIG. 5B depicts the embodiment of FIG. 5A from the x-z plane. In the x-z plane perspective, beams 100 and 101 are shown as separate lines, beam 100 is shown to be "under" channels 102-1 through 102-n, and beam 101 is shown to be "under" channels 103-1 through 103-n. Channels 102-1 through 102-n and channels 103-1 through 103-n do not pass through birefringent beam displacers 90 and 91. After striking dispersive element 11, channels 102-1 through 102-n and channels 103-1 through 103-n pass through lens 104 and strike surface 105a of first prism 106a. Channels 102-1 through 102-n reflect off surface 105a and pass through polarization modulator 16.

FIG. 5C shows that polarization modulator 16 is segmented along the y-axis as defined by coordinate system 8. Each segment can be tuned to change the polarization state of a portion of incident channels. Thus, at least a portion of channel 102-i, which was initially polarized perpendicular to the optic axis of birefringent beam displacer 90, becomes polarized parallel to the optic axis of birefringent beam displacer 90. Likewise, at least a portion of channel 103-i, which was initially polarized in the x-z plane which contains the optic axis of birefringent beam displacer 90, becomes polarized perpendicular to the optic axis of birefringent beam displacer 90. After passing through polarization modulator 16, channels 102-i and 103-i reflect off surface 105b of second prism 106b and return to dispersive element 11 through lens 104. Dispersive element 11 recombines channels 102-1 through 102-n into beam 107, and channels 103-1 through 103-n into beam 108. Both beam 107 and beam 108 travel through birefringent wedge 91. In the exemplary embodiment of FIG. 5B, the optic axis of birefringent beam displacer 91 is parallel to the optic axis of birefringent beam displacer 90. In those embodiments, the portion of beam 107 which changed its polarization state when it passed through polarization modulator 16 is indicated as beams 107a, and is displaced in birefringent beam displacer 91 as shown by line 115. The portion of beam 107 which did not change the polarization state upon passing through polarization modulator 16 passes through birefringent beam displacer 91 without displacement, and is denoted as beam 107b. Beam 107b is not coupled into an output fiber, and therefore contributes to the attenuation.

The portion of beam 108 which did change its polarization state when it passed through polarization modulator 16 is denoted as beam 108a, and passes through birefringent beam displacer 91 without displacement. Beam 108a combines with beam 107a to form an output signal which is coupled into an output fiber (not shown). The portion of beam 108 which did not change its polarization state is displaced along line 116 when it passes through birefringent beam displacer 91, and is denoted as beam 108-i. Like beam 107b, beam 108b is not coupled into an output fiber. Thus, wavelength-selective attenuation is achieved by using polarization modulator 16 to control the polarization states of channels 102-i and 103-i.

Figure 6:
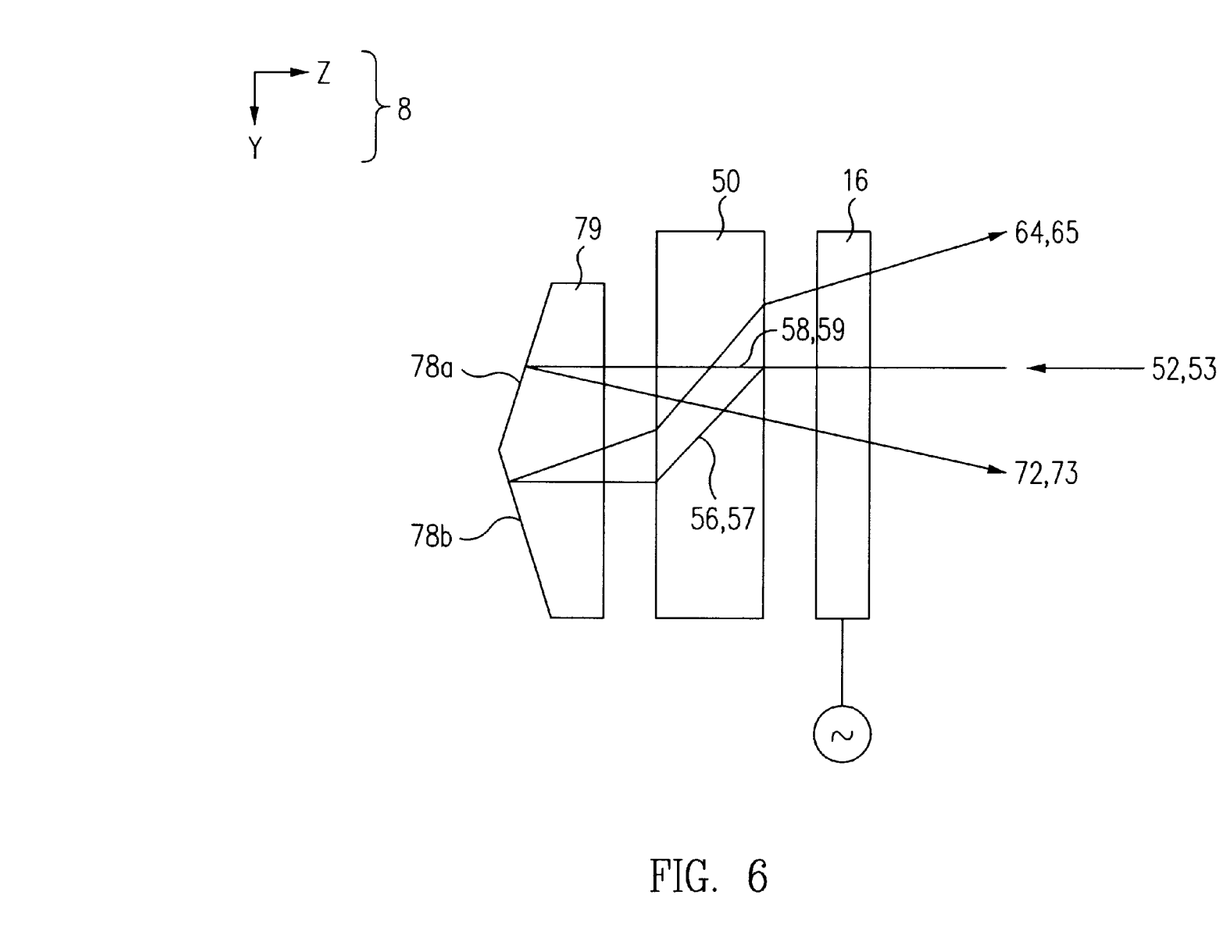
FIG. 6 shows a wavelength-selective intensity modulator including a polarization modulator, a birefringent beam displacer, and an angled reflector.

FIG. 6 depicts an embodiment of wavelength-selective intensity modulator including polarization modulator 16, first birefringent beam displacer 50, angled reflector 79, and a wavelength dispersive element (not shown). Polarization modulator 16 is segmented along the x-axis, and each segment can be tuned to modulate the polarization states of incident beams. Channels 52 and 53, which are spatially separated along the x-axis as defined by coordinate system 8, exit wavelength dispersive element 11 and pass through different segments of polarization modulator 16. Channels 52 and 53 exit polarization modulator 16 with new polarization components. When channel 52 strikes first birefringent beam displacer 50, the portion of channel 52 that is polarized along the x-direction pass through as beam 58 without displacement, while the portion that is polarized along the y-direction is displaced and becomes beam 56. Similarly, when channel 53 strikes birefringent beam displacer 50, it splits into beam 59 polarized in the x-direction, and beam 57 polarized in the y-direction as defined by coordinate system 8. Beams 58 and 59 enter angled reflector 79 at a point that is separated along the y-axis from the point at which beams 56 and 57 enter angled reflector 79. Beams 58 and 59 strike reflective surface 78a and propagate through first birefringent beam displacer 50 and polarization modulator 16 as beams 72 and 73, respectively. Beams 56 and 57, on the other hand, reflect off of reflective surface 78b and propagate through first birefringent beam displacer 50 and polarization modulator 16 as beams 64 and 65, respectively. To achieve attenuation, only beams 64 and 65 (not output channels 72 and 73) may be coupled into an output fiber. Tuning the segments of polarization modulator 16 controls how much intensity remains in output channels 64 and 65. Therefore, the intensity of beams 64 and 65 can be modulated using the tuner for polarization modulator 16.

Figure 7:
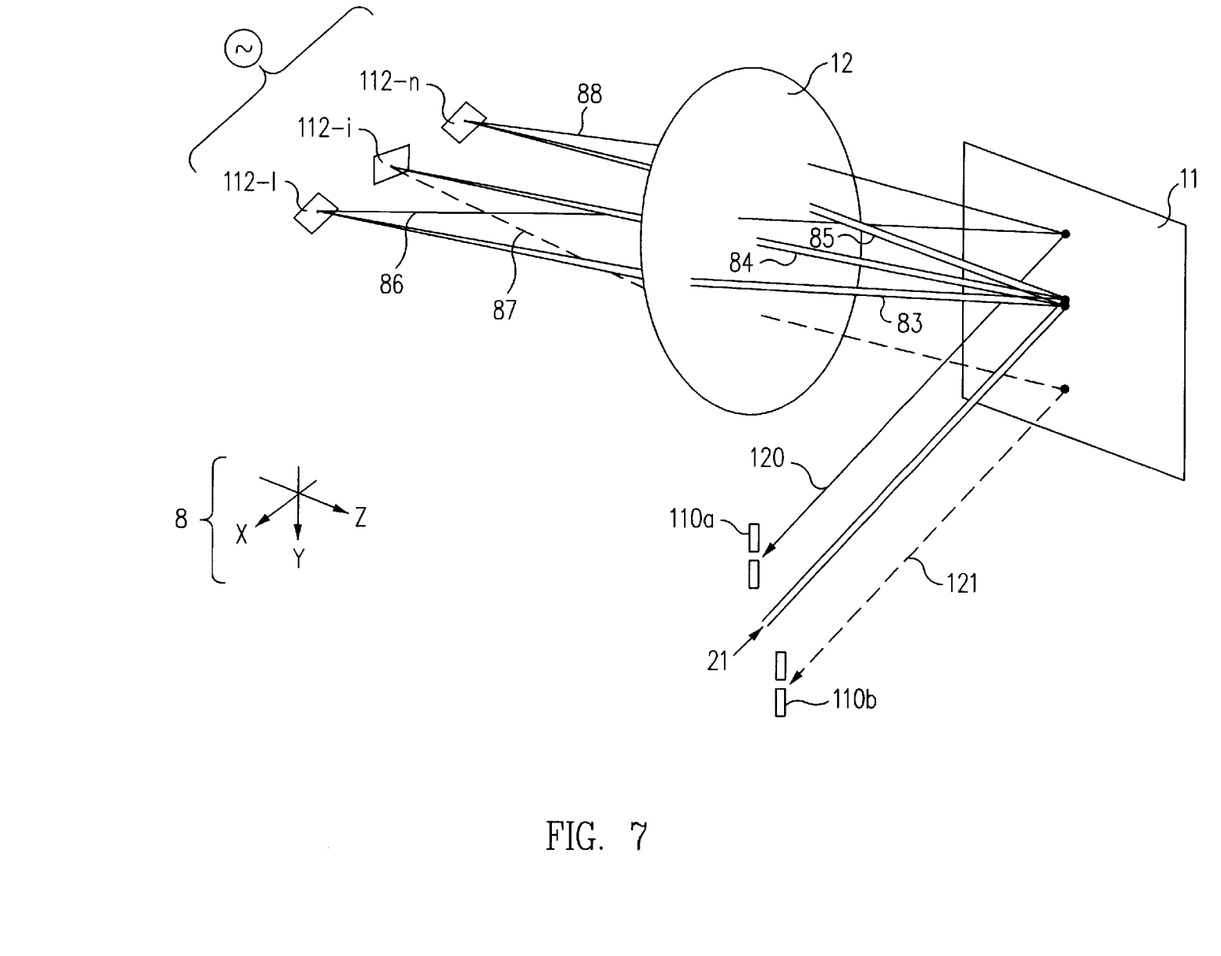
FIG. 7 shows a wavelength-selective intensity modulator including an aperture and a micro-mirror array modulator.

FIG. 7 depicts an embodiment of WDM wavelength-selective intensity modulator 1 including a micro-mirror array optical router and apertures 110a and 110b. A micro-mirror array optical router includes a plurality of tunable micro-mirrors 112-1 through 112-n, dispersive element 11, lens 12, and at least one aperture 110. As used herein, micro-mirror 112-i refers to one of micro-mirrors 112-1 through 112-n. Input signal 21 strikes dispersive element 11 and splits into channels 83, 84, and 85. Lens 12 focuses each of channels 83, 84, and 85 onto a different micro-mirror 112-i. Since the angles of each micro mirror is tunable, each micro-mirror 112-i can be set to reflect the channels in a preselected direction. After being reflected, each channel strikes dispersive element 11 and is coupled into an output fiber. The example in FIG. 7 shows two output channels, channel 120 and channel 121. Attenuation can be achieved by tuning micro-mirrors 112 to control the intensity of channel 120 and channel 121, and coupling only one of the two channels into an output fiber or coupling the two channels into different output fibers. Further intensity modulation can be achieved by controlling the size of apertures 110a and 110b, thereby allowing only a portion of output channel 118 to be coupled into the optical fiber. Further details on the micro-mirror array are provided in pending U.S. patent application Ser. No. 09/794,590 to Ming Li, et al entitled "An Optical Wavelength Router Using Reflective Surfaces to Direct Output Signals."

While the present invention is illustrated with particular embodiments, it is not intended that the scope of the invention be limited to the specific and preferred embodiments illustrated and described.

What is claimed is:

1. A wavelength-selective intensity modulator comprising:
    a birefringent element having optic axis aligned to spatially separate a beam of light according to the direction of polarization;
    a dispersive element optically coupled to said birefringent element; and
    a polarization modulator optically coupled to said dispersive element, wherein said polarization modulator comprises a plurality of segments, wherein a first polarized beam comprising a first linear polarization and a second polarized beam comprising a second linear polarization pass through separate segments.

2. The wavelength-selective intensity modulator of claim 1, wherein said segments are tunable within a predefined range, said segments aligned along an axis perpendicular to the direction in which said beam of light travels through said polarization modulator.

3. The wavelength-selective intensity modulator of claim 1, wherein said segments are placed in one of a plurality of settings, each setting being associated with changing an incident channel of light by a predetermined number of degrees.

4. The wavelength-selective intensity modulator of claim 3, further comprising:
    a second dispersive element optically coupled to said polarization modulator;
    a second birefringent element optically coupled to said second dispersive element; and
    a second lens optically coupled to said second dispersive element and said polarization modulator.

5. The wavelength-selective intensity modulator of claim 4, wherein said first birefringent element and said second birefringent element are connected to two opposing sides of said polarization modulator.

6. The wavelength-selective intensity modulator of claim 4, further comprising a half-wave plate coupled to said second dispersive element and said second birefringent element.

7. The wavelength-selective intensity modulator of claim 4, wherein the distance between said second lens and said polarization modulator is substantially equal to the focal length of said second lens in the medium between said lens and said polarization modulator.

8. The wavelength-selective intensity modulator of claim 4 wherein at least one of said first and second birefringent elements comprises one of calcite crystals, yttrium vanadate, and yttrium orthovanadate.

9. The wavelength-selective intensity modulator of claim 1, further comprising a first lens optically coupled to said dispersive element and said polarization modulator.

10. The wavelength-selective intensity modulator of claim 9, further comprising:
    a reflective surface on said polarization modulator; and
    a half-wave waveplate optically coupled to said dispersive element and said first lens and positioned to intersect beams traveling from said reflective surface to said dispersive element.

11. The wavelength-selective intensity modulator of claim 9, wherein said first lens comprises a cylindrical lens.

12. The wavelength-selective intensity modulator of claim 1, wherein said dispersive element is wavelength-dispersive.

13. The wavelength-selective intensity modulator of claim 1, wherein said dispersive element is a diffraction grating.

14. A wavelength-selective intensity modulator comprising:
    a birefringent element having optic axis aligned to spatially separate a beam of light according to the direction of polarization;
    a dispersive element optically coupled to said birefringent element;
    a polarization modulator optically coupled to said dispersive element, wherein said polarization modulator comprises a plurality of segments tunable within a predefined range, said segments aligned along an axis perpendicular to the direction in which said beam of light travels through said polarization modulator; and
    an angled reflector coupled to said birefringent element, said angled reflector comprising two or more reflective surfaces positioned at an angle with respect to one another.

15. A wavelength-selective intensity modulator comprising:
    a birefringent element having optic axis aligned to spatially separate a beam of light according to the direction of polarization;
    a dispersive element optically coupled to said birefringent element; and
    a polarization modulator optically coupled to said dispersive element, wherein said polarization modulator comprises a plurality of segments tunable within a predefined range, said segments aligned along an axis perpendicular to the direction in which said beam of light travels through said polarization modulator, wherein segments are aligned along an axis parallel to the direction in which said beam of light travels from said dispersive element, further comprising a first prism and a second prism coupled to two opposing sides of said polarization modulator, said first prism reflecting a channel toward said second prism and said second prism reflecting said As channel toward said dispersive element.

16. A wavelength-selective intensity modulator comprising:
    a birefringent element having optic axis aligned to spatially separate a beam of light according to the direction of polarization;
    a dispersive element optically coupled to said birefringent element, wherein said dispersive element is an Echelle grating; and a polarization modulator optically coupled to said dispersive element, wherein said polarization modulator comprises a plurality of segments tunable within a predefined range, said segments aligned along an axis perpendicular to the direction in which said beam of light travels through said polarization modulator, wherein segments are aligned along an axis parallel to the direction in which said beam of light travels from said dispersive element, further comprising a first prism and a second prism coupled to two opposing sides of said polarization modulator, said first prism reflecting a channel toward said second prism and said second prism reflecting said channel toward said dispersive element.

17. A method of modulating the intensity of a multiplexed optical signal, said method comprising:

spatially separating said optical signal into a first light bin comprising a first polarization and a second light beam comprising a second polarization;

spatially separating the first light beam into a plurality of first channel light beams and the second light beam into a plurality of second channel light beams according to wavelength;

selectively changing the direction polarization of at least some of said plurality of first and second channel light beams, wherein the changing is performed pair-wise upon one of the first channel light beams and one of the second channel light beams;

using a birefringent element to create an output signal and an attenuation beam, said attenuation beam being spatially separate from said output signal; and coupling only said output signal into a signal transfer medium.

18. The method of claim 17, further comprising inserting a parallel birefringent plate between said birefringent element and said signal transfer medium to compensate for polarization mode dispersion, the optic axis of said parallel birefringent plate being perpendicular to the optic axis of said birefringent element.

19. The method of claim 17, further comprising reflecting said light beams off of a reflective surface after using said birefringent element to spatially separate said channels.

20. The method of claim 17, further comprising passing said channels through an aperture to achieve the desired degree of attenuation.

21. A method of modulating the intensity of a multiplexed optical signal, said method comprising:

spatially separating said optical signal into a plurality of light beams according to the direction of polarization;

selectively changing the direction of polarization of at least some of said plurality of light beams;

using a birefringent element to create an output signal and an attenuation beam, said attenuation beam being spatially separate from said output signal;

coupling only said output signal into a signal transfer medium;

reflecting said light beams off of a reflective surface after using said birefringent element to spatially separate channels, wherein said reflective surface comprises two or more angled reflective surfaces that reflect different incident channels in different directions.

22. A wavelength-selective intensity modulator comprising:

a birefringent element having optic axis aligned to spatially separate a beam of light according to the direction of polarization;

a dispersive element optically coupled to said birefringent element; and a polarization modulator optically coupled to said dispersive element, wherein said polarization modulator comprises a plurality of segments, each of said segments being placed in one of a plurality of settings, each setting being associated with changing an incident channel of light by a predetermined number of degrees, wherein segments are aligned along an axis parallel to the direction in which said beam of light travels from said dispersive element, further comprising a first prism and a second prism coupled to two opposing sides of said polarization modulator, said first prism reflecting said channel toward said second prism and said second prism reflecting said channel toward said dispersive element.

23. A wavelength-selective intensity modulator comprising:

a birefringent element having optic axis aligned to spatially separate a beam of light according to the direction of polarization;

a dispersive element optically coupled to said birefringent element, wherein said dispersive element is an Echelle grating; and a polarization modulator optically coupled to said dispersive element, wherein said polarization modulator comprises a plurality of segments, each of said segments being placed in one of a plurality of settings, each setting being associated with changing an incident channel of light by a predetermined number of degrees, wherein segments are aligned along an axis parallel to the direction in which said beam of light travels from said dispersive element, further comprising a first prism and a second prism coupled to two opposing sides of said polarization modulator, said first prism reflecting said channel toward said second prism and said second prism reflecting said channel toward said dispersive element.

24. A wavelength-selective intensity modulator comprising:

a birefringent element having an optic axis aligned to spatially separate a light beam according to a direction of polarization;

a dispersive element optically coupled to said birefringent element; and a polarization modulator optically coupled to said dispersive element, wherein said polarization modulator is operable for transforming at least one portion of said separated light beam into an elliptically polarized light beam, wherein said polarization modulator comprises a plurality of segments tunable within a predefined range, said segments aligned along an axis perpendicular to the direction in which said beam of light travels through said polarization modulator.

25. A wavelength-selective intensity modulator comprising:

a birefringent element having an optic axis aligned to spatially separate a light beam according to a direction of polarization;

a dispersive element optically coupled to said birefringent element; and a polarization modulator optically coupled to said dispersive element, wherein said polarization modulator is operable for transforming at least one portion of said separated light beam into an elliptically polarized light beam, wherein said polarization modulator comprises a plurality of segments, each of said segments being placed in one of a plurality of settings, each setting being associated with transforming a polarized light beam into a different state of elliptical polarization.

26. A method of modulating the intensity of a multiplexed optical signal, said method comprising:

spatially separating said optical signal into a plurality of channel light beams according to wavelength;

spatially separating each channel light beam into a first polarized channel light beam comprising a first polarization and a second polarized channel light beams comprising a second polarization;

selectively changing the direction of polarization of at least some of said plurality of first polarized channel light beams and second polarized channel light beams, wherein the changing is performed pair-wise upon a first polarized channel light beam and a second polarized channel light beam;

using a birefringent element to create an output signal and an attenuation beam, said attenuation beam being spatially separate from said output signal; and coupling only said output signal into a signal transfer medium.

* * * * *